(12) United States Patent
Sun et al.

(10) Patent No.: US 11,087,741 B2
(45) Date of Patent: Aug. 10, 2021

(54) METHOD, APPARATUS, DEVICE AND STORAGE MEDIUM FOR PROCESSING FAR-FIELD ENVIRONMENTAL NOISE

(71) Applicant: BEIJING BAIDU NETCOM SCIENCE AND TECHNOLOGY CO., LTD., Beijing (CN)

(72) Inventors: Jianwei Sun, Beijing (CN); Chao Li, Beijing (CN); Xin Li, Beijing (CN); Weixin Zhu, Beijing (CN); Ming Wen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 253 days.

(21) Appl. No.: 16/254,309

(22) Filed: Jan. 22, 2019

(65) Prior Publication Data
US 2019/0237062 A1    Aug. 1, 2019

(30) Foreign Application Priority Data
Feb. 1, 2018 (CN) .......................... 201810103427.2

(51) Int. Cl.
*G10L 15/06* (2013.01)
*G10L 21/0264* (2013.01)
(Continued)

(52) U.S. Cl.
CPC ........ *G10L 15/063* (2013.01); *G10L 21/0216* (2013.01); *G10L 21/0264* (2013.01);
(Continued)

(58) Field of Classification Search
None
See application file for complete search history.

(56) References Cited

U.S. PATENT DOCUMENTS 6,389,393 B1 *   5/2002   Gong ................... G10L 15/065
                                                           704/244
8,266,078 B2     9/2012   Zou et al.
(Continued)

FOREIGN PATENT DOCUMENTS

CN       01331467      1/2002
CN      101609686     12/2009
(Continued)

OTHER PUBLICATIONS

Karafiát M, Veselý K, Žmolíková K, Delcroix M, Watanabe S, Burget L, Szőke I. Training data augmentation and data selection. InNew Era for Robust Speech Recognition 2017 (pp. 245-260). Springer, Cham. (Year: 2017).*

(Continued)

*Primary Examiner* — Jonathan C Kim
(74) *Attorney, Agent, or Firm* — Knobbe Martens Olson & Bear LLP

(57) ABSTRACT

Embodiments of the present disclosure include methods, apparatuses, devices, and computer readable storage mediums for processing far-field environmental noise. The method can comprise processing collected far-field environmental noise to a noise segment in a predetermined format. The method can further comprise establishing a far-field voice recognition model based on the noise segment and a near-field voice segment; and determining validity of the noise segment based on the far-field voice recognition model. The solution of the present disclosure can optimize anti-noise performance of the far-field voice recognition model by differentiated training of noise in different user scenarios of a far-field voice recognition product.

15 Claims, 3 Drawing Sheets

(51) Int. Cl.
  *G10L 25/78* (2013.01)
  *G10L 21/0216* (2013.01)
  *G10L 15/20* (2006.01)
  *G10L 15/16* (2006.01)
  *G10L 25/51* (2013.01)

(52) U.S. Cl.
  CPC ............. *G10L 25/78* (2013.01); *G10L 15/16* (2013.01); *G10L 15/20* (2013.01); *G10L 25/51* (2013.01); *G10L 2015/0631* (2013.01); *G10L 2025/783* (2013.01)

(56) References Cited

U.S. PATENT DOCUMENTS

| | | | |
|---|---|---|---|
| 9,299,347 B1* | 3/2016 | Siohan | G10L 15/10 |
| 9,640,179 B1* | 5/2017 | Hart | G10L 15/20 |
| 10,598,543 B1* | 3/2020 | Mansour | H04R 3/005 |
| 2011/0246192 A1* | 10/2011 | Homma | G10L 25/69 704/228 |
| 2011/0257974 A1* | 10/2011 | Kristjansson | G10L 21/0208 704/246 |
| 2011/0305345 A1* | 12/2011 | Bouchard | G10L 21/0208 381/23.1 |
| 2015/0112672 A1* | 4/2015 | Giacobello | G10L 21/0208 704/233 |
| 2015/0162004 A1* | 6/2015 | Goesnar | G10L 17/00 704/275 |
| 2016/0232914 A1* | 8/2016 | Liang | G10L 21/0208 |
| 2017/0178662 A1* | 6/2017 | Ayrapetian | G10L 21/0216 |
| 2017/0353789 A1* | 12/2017 | Kim | H04R 3/005 |
| 2018/0053512 A1* | 2/2018 | Cilingir | G10L 21/0208 |
| 2018/0102135 A1* | 4/2018 | Ebenezer | G10L 25/30 |
| 2018/0247643 A1* | 8/2018 | Battenberg | G10L 15/02 |
| 2019/0043482 A1* | 2/2019 | Li | G10L 15/063 |
| 2019/0228791 A1* | 7/2019 | Sun | G10L 21/0272 |
| 2019/0237065 A1* | 8/2019 | Xue | G10L 15/22 |
| 2020/0105287 A1* | 4/2020 | Chang | G10L 15/063 |
| 2020/0168208 A1* | 5/2020 | Mitra | G10L 15/075 |
| 2020/0302951 A1* | 9/2020 | Deng | G08B 21/0208 |
| 2020/0342890 A1* | 10/2020 | Ma | G01H 17/00 |

FOREIGN PATENT DOCUMENTS

| | | |
|---|---|---|
| CN | 103514878 | 1/2014 |
| CN | 103561413 | 2/2014 |
| CN | 104035743 | 9/2014 |
| CN | 105448303 | 3/2016 |
| CN | 106796785 | 5/2017 |
| EP | 0862162 | 3/1999 |
| WO | WO 2016167779 | 10/2016 |

OTHER PUBLICATIONS

Hannun A, Case C, Casper J, Catanzaro B, Diamos G, Eisen E, Prenger R, Satheesh S, Sengupta S, Coates A, Ng AY. Deep speech: Scaling up end-to-end speech recognition. arXiv preprint arXiv:1412.5567. Dec. 17, 2014. (Year: 2014).*

Wang S, Hou J, Xie L, Hao Y. Hellonpu: A corpus for small-footprint wake-up word detection research. InNational Conference on Man-Machine Speech Communication Oct. 11, 2017 (pp. 70-79). Springer, Singapore. (Year: 2017).*

Ko T, Peddinti V, Povey D, Seltzer ML, Khudanpur S. A study on data augmentation of reverberant speech for robust speech recognition. In2017 IEEE International Conference on Acoustics, Speech and Signal Processing (ICASSP) Mar. 5, 2017 (pp. 5220-5224). IEEE. (Year: 2017).*

Ravanelli M, Svaizer P, Omologo M. Realistic multi-microphone data simulation for distant speech recognition. arXiv preprint arXiv:1711.09470. Nov. 26, 2017. (Year: 2017).*

Watanabe, et al., "New Era for Robust Speech Recognition", Springer, 2017. 433 pages.

Chinese Office Action dated Apr. 15, 2021 for Chinese Patent Application No. 201810103427.2. 3 pages.

Research on Anti-Noise Speech Recognition Technology.

Yuan, Shenglong, "Research on Spoken Term Detection Based on ASR Under Limited-Resource Conditions", University of Science and Technology of China, A dissertation for master's degree. Apr. 26, 2016.

* cited by examiner

METHOD, APPARATUS, DEVICE AND STORAGE MEDIUM FOR PROCESSING FAR-FIELD ENVIRONMENTAL NOISE

CROSS-REFERENCE TO RELATED APPLICATIONS

This application claims priority to Chinese Patent Application No. 201810103427.2, filed on Feb. 1, 2018, titled "Method, Apparatus, Device and Storage Medium for Processing Far-field Environmental Noise," which is hereby incorporated by reference in its entirety.

TECHNICAL FIELD

Embodiments of the present disclosure mainly relate to voice recognition, and more specifically relate to a method, apparatus, device, and computer readable medium for training a far-field voice recognition model.

BACKGROUND

At present, products associated with the far-field voice recognition, such as smart loudspeakers, smart refrigerators, or mobile phone maps, have become a trend. When training the far-field voice recognition model, due to the lack of real far-field voice data, it is necessary to expand the far-field voice recognition training data scale by imnoising the near-field voice data using an imnoising method.

However, for the products associated with the far-field voice recognition, the use scenarios of the products are different, and the noise attributes in various scenarios are different. Therefore, it is necessary to collect noise from different scenarios for imnoise training of the near-field data according to the product attributes, to targetedly improve the anti-noise performance of the acoustic model of the far-field voice recognition.

SUMMARY

The object of embodiments of the present disclosure includes providing a solution for training a far-field voice recognition model to solve problems in existing technologies.

A first aspect of the present disclosure provides a method for processing far-field environmental noise. The method includes processing collected far-field environmental noise into a noise segment in a predetermined format. The method further includes establishing a far-field voice recognition model based on the noise segment and a near-field voice segment; and determining validity of the noise segment based on the far-field voice recognition model.

A second aspect of the present disclosure provides an apparatus for processing far-field environmental noise. The apparatus includes a first processing module configured for processing collected far-field environmental noise into a noise segment in a predetermined format. The apparatus further includes a first establishing module configured for establishing a far-field voice recognition model based on the noise segment and a near-field voice segment; and a first determining module configured for determining validity of the noise segment based on the far-field voice recognition model.

A third aspect of the present disclosure provides a computing device, including one or more processors; and a memory for storing one or more programs. The one or more programs cause, when executed by the one or more processors, the one or more processors to implement the method according to the first aspect of the present disclosure.

A fourth aspect of the present disclosure provides a computer readable medium storing a computer program therein. The program implements, when executed by a processor, the method according to the first aspect of the present disclosure.

The SUMMARY portion is provided to simply introduce choices of concepts, which will be further described in the embodiments hereinafter. The SUMMARY portion is neither intended to identify key features or main features of the present disclosure, nor intended to limit the scope of the present disclosure.

BRIEF DESCRIPTION OF THE DRAWINGS

By reading the detailed description hereinafter with reference to the accompanying drawings, the above and other objects, features, and advantages of the embodiments of the present disclosure will become readily understood. In the drawings, some embodiments of the present disclosure are illustrated by way of non-limiting examples.

In the drawings, identical or corresponding reference numerals indicate identical or corresponding parts.

DETAILED DESCRIPTION OF EMBODIMENTS

Figure 1:
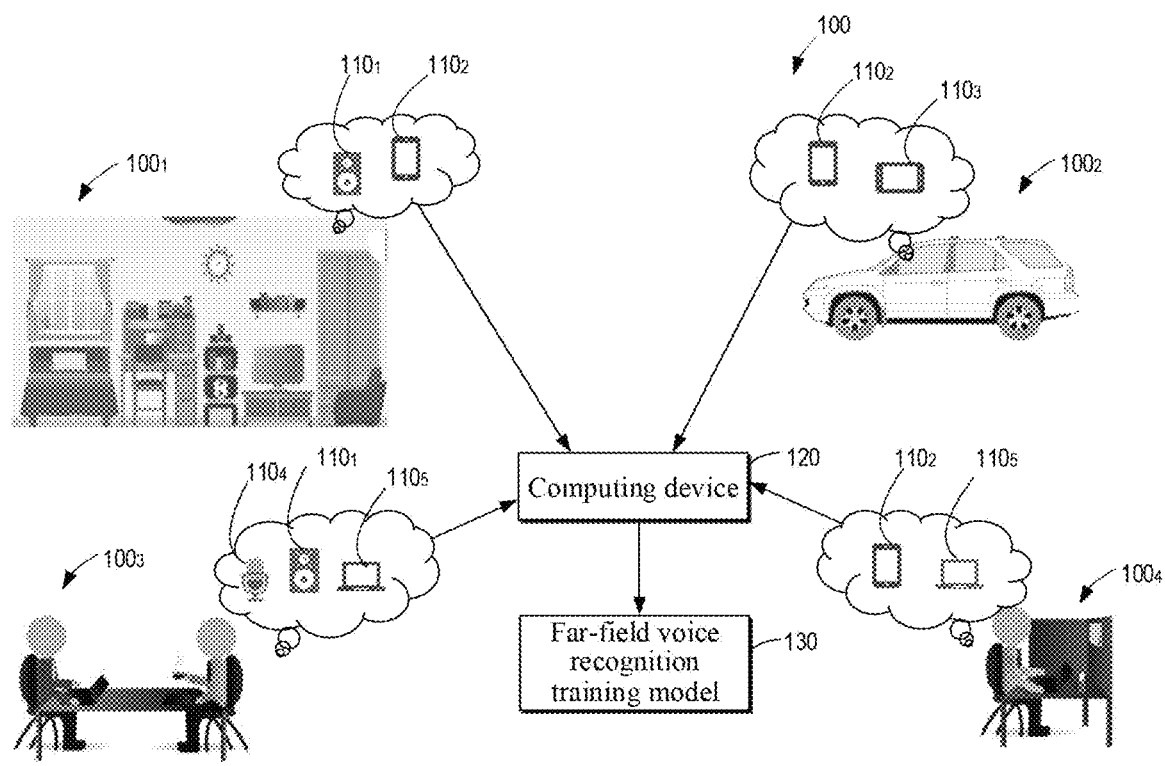
FIG. 1 shows a schematic diagram of an exemplary environment in which a plurality of embodiments of the present disclosure may be implemented.

Embodiments of the present disclosure will be described in more detail hereinafter by referring to the accompanying drawings. Though some embodiments of the present disclosure are shown in the drawings, it should be understood that the present disclosure may be implemented in various forms, and should not be construed as limited to the embodiments set forth herein. These embodiments are provided to more thoroughly and completely understand the present disclosure. It should be understood that the drawings and embodiments of the present disclosure are only used as examples, rather than limiting the scope of protection of the present disclosure.

In the description on embodiments of the disclosure, the term "include" and wordings similar to the term should be understood as open-ended inclusion, i.e., "including but not limited to." The term "based on" should be understood as "at least partially based on." The term "an embodiment" or "the embodiment" should be understood as "at least one embodiment." The terms, such as "first," and "second," may refer to different objects or same object. Other explicit and implicit definitions may also be included hereinafter.

Traditionally, due to the lack of real far-field voice data, usually near-field voice data may be imnoised to obtain simulated far-field voice recognition training data. However, for products associated with far-field voice recognition, such as smart speakers, smart refrigerators, or mobile phone maps, since noise in use scenarios of the products may have different attributes, robustness of the far-field voice recognition model may be reduced in case of unified processing of noise of different attributes, and the processing quality may become worse.

For the above problems and other potential associated problems, the embodiments of the present disclosure targetedly process the far-field environmental noise for differentiated noise scenarios. In an embodiment of the present disclosure, based on noise sources and noise generation scenarios, noise is mainly divided into types, such as household noise, vehicle and machine noise, office noise, and workstation noise, and for different attributes of noise in different types (such different attributes are referred to as noise differentiation), noise from different noise sources may be processed. In this way, by differentiated trainings of noise in different user scenarios of a far-field voice recognition product, anti-noise performance of the far-field voice recognition model is optimized, and robustness of the far-field voice recognition model is improved.

As used herein, the term "model" may learn an association between corresponding inputs and outputs from the training data, to generate a corresponding output for a given input after completing training. It should be understood that, the "model" may also be referred to as a "neural network," a "learning model," or a "learning network."

As used herein, the term "far-field voice" generally refers to a man-machine interaction operation when a distance between a user and a voice device is 3-5 m. For example, the far-field voice recognition technology enables the user to operate a smart device by voice even at a distance little far from the smart device.

Embodiments of the present disclosure will be specifically described hereinafter by referring to the drawings.

FIG. 1 shows a schematic diagram of an exemplary environment 100 in which a plurality of embodiments of the present disclosure may be implemented. As shown in FIG. 1, the exemplary environment 100 includes a household noise environment 1001, a vehicle and machine noise environment 1002, an office noise environment 1003, and a workstation noise environment 1004.

In the example in FIG. 1, a far-field voice recognition training model 130 is established by a computing device 120. In some embodiments, the computing device 120 may establish the far-field voice recognition training model 130 based on training data.

In order to be able to establish the far-field voice recognition training model 130, the corresponding training data needs to be collected. For different noise environments, the corresponding training data may be acquired by different noise collection devices (also referred to as "collection entities"). In some embodiments, the collection entity may be implemented as a far-field voice recognition product used in a corresponding noise environment. For example, as shown in FIG. 1, the collection entity in the household noise environment 1001 may be a smart loudspeaker 1101 and a mobile phone 1102, the collection entity in the vehicle and machine noise environment 1002 may be the mobile phone 1102 and a vehicle-mounted device 1103, the collection entity in the office noise environment 1003 may be the smart loudspeaker 1101, a microphone 1104 of other device, and a notebook computer 1105, and the collection entity in the workstation noise environment 1004 may be the mobile phone 1102 and the notebook computer 1105.

In the process of collecting noise, the collection entity may run for a long time to collect noise data. The collection duration for the collection entity may be defined by the storage capacity of the collection entity.

The collection entity provides collected training data to the computing device 120. In some embodiments, the computing device 120 may be implemented on the collection entity. Alternatively, the computing device 120 may be away from the collection entity, and communicate with the collection entity by wired or wireless connection.

It should be understood that besides the environment 100 shown in FIG. 1, i.e., the household noise environment 1001, the vehicle and machine noise environment 1002, the office noise environment 1003, and the workstation noise environment 1004, far-field environmental noise from other noise generation environments may also be included in the scope of some embodiments of the present disclosure.

Figure 2:
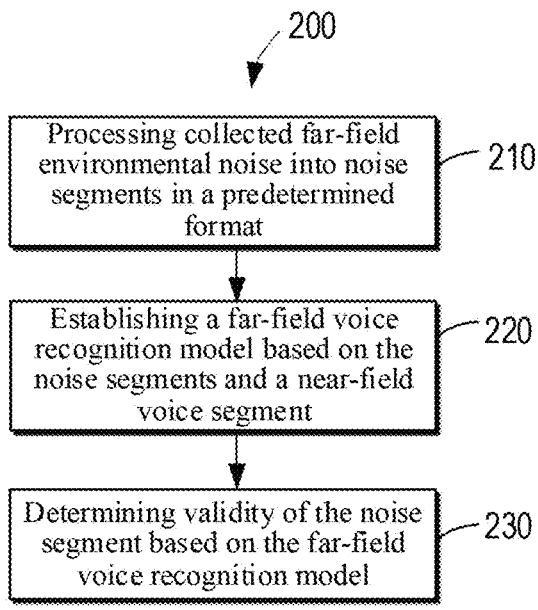
FIG. 2 shows a flow chart of a process of a method for processing far-field environmental noise according to some embodiments of the present disclosure.

FIG. 2 shows a flow chart of a process 200 of a method for training a far-field voice recognition model according to some embodiments of the present disclosure. The method according to some embodiments of the present disclosure is described in detail hereinafter by referring to FIG. 2. The process 200 may be executed by, for example, the computing device 120 shown in FIG. 1.

Box 210 includes: processing collected far-field environmental noise to a noise segment in a predetermined format. It should be understood that the noise segment in the predetermined format here means that the collected noise segment may be processed to have a predetermined sampling rate, a predetermined noise segment length, or the like.

As mentioned above, in the process of collecting noise, the collection entity may run for a long time to collect noise data. However, a noise segment collected for too long may occupy a large amount of computer memory during voice imnoising. Therefore, it is necessary to segment the long collected noise segment. A collected noise segment may be too short. An error may be reported by direct voice imnoising of the collected segment shorter than a voice segment. Therefore, it is necessary to expand the frame of the too short collected noise segment.

In some embodiments, the length of the collected segment of the far-field environmental noise may be determined. If the length of the collected segment is greater than a threshold length, e.g., one minute, then the collected segment is cut. For example, the collected segment may be segmented into a plurality of subsegments having a length of one minute, to prevent memory overflow in the process of voice imnoising. If the length of the collected segment is smaller than the threshold length, then the frame of the collected segment may be expanded.

After finishing collecting segments of the far-field environmental noise, the sampling rate of the collected segments need to be standardized. Here, the term "sampling rate" refers to an audio sampling rate, and refers to a number of sampling sound signals by a recorder within one second, for example, may be expressed as 16,000 sampling points/second. In some embodiments, the sampling rate of the collected segments of the far-field environmental noise may be determined. If the length of the collected segment is greater than a threshold sampling rate, then the collected segment is downsampled to reach the threshold sampling rate. If the sampling rate of the collected segment is greater than the threshold sampling rate, then the collected segment is discarded.

Furthermore, since the collected segment may be used for voice imnoising, a purer noise environment segment is required. The collected segment may be processed to remove non-noise portions in the collected segment. In some embodiments, portions associated with predetermined voice types may be removed from the collected segments of the far-field environmental noise. The predetermined voice type may be, e.g., a natural language voice, such as a human voice or a sound having a high similarity to the voice. The predetermined voice type may further be, e.g., a prompt tone for wakening the noise collection device, such as "tick" or "beep" emitted by a machine.

After processing the collected noise segment, a process of establishing a far-field voice recognition model may be performed. Box 220 includes: establishing the far-field voice recognition model based on the noise segment and a near-field voice segment.

Here, the "near-field voice" generally can be understood as a voice source having a distance to a voice device within 0.2 meters, e.g., a usual distance between a person and his/her handheld device during a dialogue. The characteristic of the near-field voice is that the near-field voice includes less noise caused by the surrounding environment.

In some embodiments, the near-field voice segment may be imnoised using the noise segment. For example, a given near-field voice segment, e.g., a human voice diaglogue, is mixed with noise segments collected from different noise scenarios. These near-field voice segments mixed with the noise segments may be referred to as imnoised near-field voice segments.

Features may be extracted from these imnoised near-field voice segments. The feature extraction here can be understood as extracting a FilterBank (FBank) feature. The FBank feature is a front-end processing algorithm that may improve the performance of voice recognition by audio processing in a way similar to human ears. Generally, the extraction of the FBank feature includes Fourier transform, energy spectrum calculation, Mel filtering, and Log value calculation. For reasons of simplification, a specific calculation process is not described here.

In general, the FBank feature is extracted to reduce the dimension of audio data. For example, if a sampling rate of 16,000 sampling points/second is used for an audio file having a length of one second, an array converted from the audio file may have very long bits. The length of the audio file in a frame may be reduced to 80 bits by extracting the FBank feature. Then, the far-field voice recognition model is generated by model training of the voice segment whose FBank feature is extracted.

After establishing the far-field voice recognition model, it is necessary to determine whether the collected noise segment improve an effect of training the far-field voice recognition model. Box 230 includes: determining validity of the noise segment based on the far-field voice recognition model.

Figure 3:
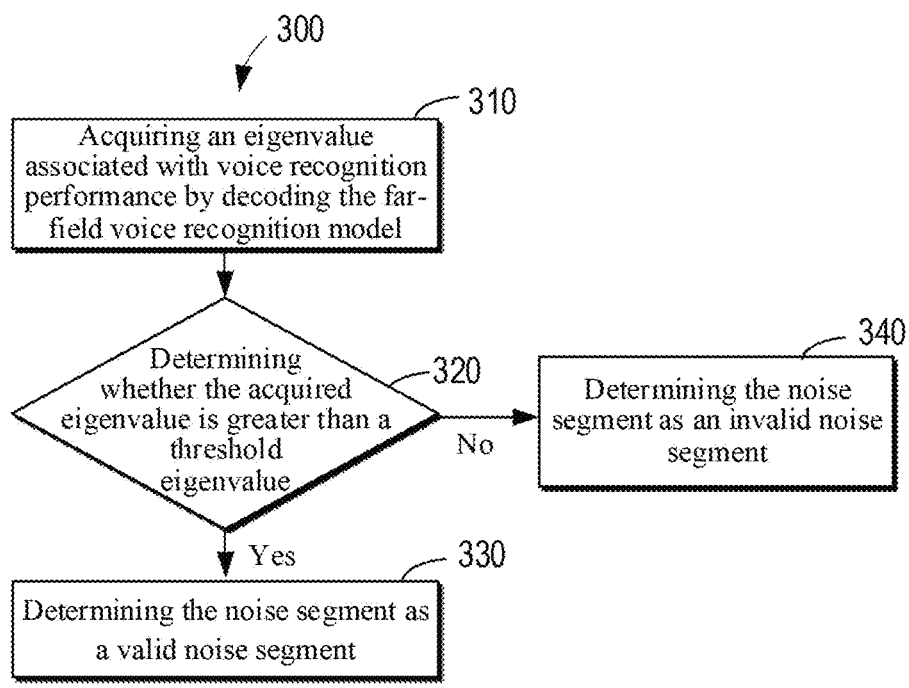
FIG. 3 shows a flow chart of a process for determining validity of a noise segment according to some embodiments of the present disclosure.

FIG. 3 shows a flow chart of a process 300 for determining validity of a noise segment according to some embodiments of the present disclosure. The process 300 for determining validity of a noise segment is further described hereinafter by referring to FIG. 3. It should be understood that the process 300 described in FIG. 3 may be an example of the box 230 in FIG. 2. Without deviating from the concept of some embodiments of the present disclosure, steps in the process 300 shown in FIG. 3 may be modified, added, or deleted in any way according to different embodiments.

Box 310 includes acquiring an eigenvalue associated with voice recognition performance by decoding the far-field voice recognition model. Here, the remote voice recognition model may be understood as an encoded audio file segment. Decoding the far-field voice recognition model may be understood as decoding the remote voice recognition model using a far-field voice test set, to textualize the far-field voice model.

Box 320 includes determining whether the acquired eigenvalue is greater than a threshold eigenvalue. Box 330 includes determining the noise segment as a valid noise segment if the eigenvalue is greater than the threshold eigenvalue. Box 340 includes determining the noise segment as an invalid noise segment if the eigenvalue is less than the threshold eigenvalue.

Though not shown in FIG. 2 and FIG. 3, in some embodiments, the process 200 may further include determining a noise collection device associated with the far-field environmental noise. The noise collection device may be at least one of a loudspeaker, a mobile phone, or a vehicle-mounted device. It should be understood that, the far-field environmental noise at least may include the household noise environment 1001, the vehicle and machine noise environment 1002, the office noise environment 1003, and the workstation noise environment 1004 as shown in FIG. 1. However, far-field environmental noise from other noise generation environment may also be included in the scope of some embodiments of the present disclosure.

The noise collection device may be any one of the collection entities 1101-1105 shown in FIG. 1. Other device capable of audio collection may also be considered for use as the noise collection device according to some embodiments of the present disclosure in accordance with the far-field environmental noise.

After determining the noise collection device, a signal for triggering the noise collection device to collect the far-field environmental noise is sent to the noise collection device, to start the noise collection device to collect noise and to receive a collected segment of the far-field environmental noise from the noise collection device.

A method for training a far-field voice recognition model according to an embodiment of the present disclosure is described hereinbefore by referring to the scenario 100 shown in FIG. 1, in conjunction with the process 200 shown in FIG. 2 and the process 300 shown in FIG. 3. The method of an embodiment of the present disclosure optimizes anti-noise performance of the far-field voice recognition model by considering differentiation of attributes of noise scenarios and differentiated training of noise in different user scenarios of a far-field voice recognition product.

Figure 4:
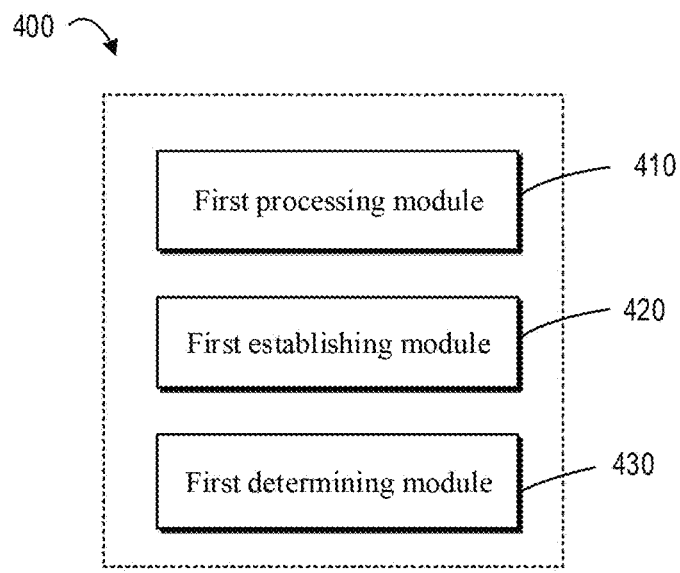
FIG. 4 shows a schematic block diagram of an apparatus for processing far-field environmental noise according to an embodiment of the present disclosure.

FIG. 4 shows an exemplary block diagram of an apparatus for training a far-field voice recognition model according to an embodiment of the present disclosure. As shown in FIG. 4, an apparatus 400 includes a first processing module 410 configured for processing collected far-field environmental noise into a noise segment in a predetermined format; a first establishing module 420 configured for establishing a far-field voice recognition model based on the noise segment and a near-field voice segment; and a first determining module 430 configured for determining validity of the noise segment based on the far-field voice recognition model.

In some embodiments, the apparatus 400 may further include a second determining module configured for determining a noise collection device associated with the far-field environmental noise, where the noise collection device is at least one of a loudspeaker, a mobile phone, or a vehicle-mounted device; a sending module configured for sending a signal for triggering the noise collection device to collect the far-field environmental noise, to the noise collection device; and a receiving module configured for receiving a collected segment of the far-field environmental noise from the noise collection device.

In some embodiments, the far-field environmental noise may include at least one of household noise, vehicle and machine noise, office noise, or workstation noise.

In some embodiments, the first processing module 410 may include a third determining module configured for determining a sampling rate of the collected segment of the far-field environmental noise; and a sampling rate adjustment module configured for downsampling, in response to the sampling rate of the collected segment being greater than a threshold sampling rate, the collected segment to the threshold sampling rate; and discarding the collected segment, in response to the sampling rate of the collected segment being smaller than the threshold sampling rate.

In some embodiments, the first processing module 410 may include a fourth determining module configured for determining a length of the collected segment of the far-field environmental noise; and a length adjustment module configured for cutting the collected segment in response to the length of the collected segment being greater than a threshold length; and expanding a frame of the collected segment in response to the length of the collected segment being smaller than the threshold length.

In some embodiments, the first processing module 410 may include a voice removing module configured for removing a portion associated with a predetermined voice type from the collected segment of the far-field environmental noise, where the predetermined voice type includes at least one of a natural language voice, or a prompt tone for wakening the noise collection device.

In some embodiments, the first establishing module 420 may include an imnoising module configured for imnoising the near-field voice segment using the noise segment; and a second establishing module configured for establishing the far-field voice recognition model based on the imnoising result.

In some embodiments, the first determining module 430 may include an acquisition module configured for acquiring an eigenvalue associated with voice recognition performance by decoding the far-field voice recognition model. The first determining module 430 may further include a fifth determining module configured for determining the noise segment as a valid noise segment in response to the eigenvalue being greater than a threshold eigenvalue; and determining the noise segment as an invalid noise segment in response to the eigenvalue being less than the threshold eigenvalue.

Figure 5:
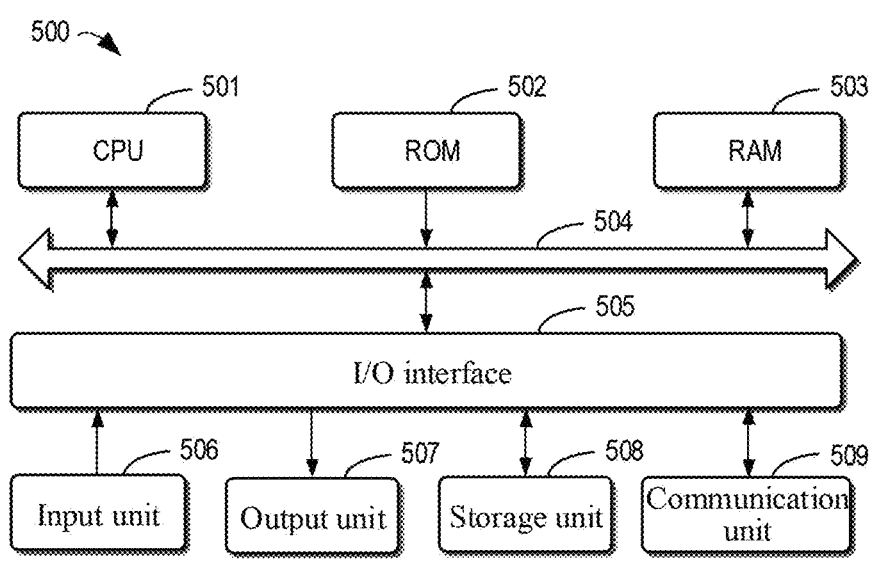
FIG. 5 shows a block diagram of a computing device capable of implementing a plurality of embodiments of the present disclosure.

FIG. 5 shows a schematic block diagram of an exemplary device 500 capable of implementing various embodiments of the present disclosure. The device 500 may be used to implement the computing device 120 as shown in FIG. 1. As shown in the figure, the device 500 includes a central processing unit (CPU) 501 that may perform various appropriate actions and processing in accordance with computer program instructions stored in a read only memory (ROM) 502 or computer program instructions loaded into a random access memory (RAM) 503 from a storage unit 508. In the RAM 503, various programs and data required for the operation of the device 500 may also be stored. The CPU 501, the ROM 502, and the RAM 503 are connected to each other through a bus 504. An input/output (I/O) interface 505 is also coupled to the bus 504.

A plurality of components in the device 500 are coupled to the I/O interface 505, including: an input unit 506, such as a keyboard or a mouse; an output unit 507, such as various types of displays, or speakers; the storage unit 508, such as a disk or an optical disk; and a communication unit 509 such as a network card, a modem, or a wireless communication transceiver. The communication unit 509 allows the device 500 to exchange information/data with other devices over a computer network such as the Internet and/or various telecommunication networks.

The processing unit 501 performs the various methods and processes described above, such as the process 200 and/or the process 300. For example, in some embodiments, the process 300 may be implemented as a computer software program that is tangibly embodied in a machine readable medium, such as the storage unit 508. In some embodiments, some or all of the computer programs may be loaded and/or installed onto the device 400 via the ROM 502 and/or the communication unit 509. When a computer program is loaded into the RAM 503 and executed by the CPU 501, one or more of the actions or steps of the process 200 and/or the process 300 described above may be performed. Alternatively, in other embodiments, the CPU 501 may be configured to perform the process 200 and/or the process 300 by any other suitable means (e.g., by means of firmware).

The functions described herein above may be performed, at least in part, by one or more hardware logic components. For example, and without limitation, exemplary types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of some embodiments of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of some embodiments of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various operations are described in a specific order, this should not be understood that such operations are required to be performed in the specific order shown or in sequential order, or all illustrated operations should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable sub-combination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

What is claimed is:

1. A method for processing far-field environmental noise, comprising:
    processing collected far-field environmental noise into a noise segment in a predetermined format;
    establishing a far-field voice recognition model based on the noise segment and a near-field voice segment; and
    determining validity of the noise segment based on the far-field voice recognition model,
    wherein the method is performed by at least one hardware processor, and
    wherein the processing the collected far-field environmental noise into a noise segment in a predetermined format comprises:
        determining a sampling rate of the collected segment of the far-field environmental noise;
        downsampling, in response to the sampling rate of the collected segment being greater than a threshold sampling rate, the collected segment to the threshold sampling rate; and
        discarding the collected segment, in response to the sampling rate of the collected segment being smaller than the threshold sampling rate.

2. The method according to claim 1, further comprising:
    determining a noise collection device associated with the far-field environmental noise, wherein the noise collection device comprises at least one of:
    a loudspeaker,
    a mobile phone, or
    a vehicle-mounted device;
    sending a signal for triggering the noise collection device to collect the far-field environmental noise, to the noise collection device; and
    receiving the collected segment of the far-field environmental noise from the noise collection device.

3. The method according to claim 1, wherein the far-field environmental noise comprises at least one of:
    household noise,
    vehicle and machine noise,
    office noise, or
    workstation noise.

4. The method according to claim 1, wherein the processing the collected far-field environmental noise into a noise segment in a predetermined format comprises:
    determining a length of the collected segment of the far-field environmental noise;
    cutting the collected segment in response to the length of the collected segment being greater than a threshold length; and
    expanding a frame of the collected segment in response to the length of the collected segment being smaller than the threshold length.

5. The method according to claim 1, wherein the processing the collected far-field environmental noise into a noise segment in a predetermined format comprises:
    removing a portion associated with a predetermined voice type from the collected segment of the far-field environmental noise, wherein the predetermined voice type includes at least one of:
    a natural language voice; or
    a prompt tone for wakening the noise collection device.

6. The method according to claim 1, wherein the establishing the far-field voice recognition model comprises:
    adding noise to the near-field voice segment using the noise segment; and
    establishing the far-field voice recognition model based on adding the noise.

7. The method according to claim 1, wherein the determining validity of the noise segment comprises:
    acquiring an eigenvalue associated with voice recognition performance by decoding the far-field voice recognition model;
    determining the noise segment as a valid noise segment in response to the eigenvalue being greater than a threshold eigenvalue; and
    determining the noise segment as an invalid noise segment in response to the eigenvalue being smaller than the threshold eigenvalue.

8. An apparatus for processing far-field environmental noise, comprising:
    at least one processor; and
    a memory storing instructions, wherein the instructions when executed by the at least one processor, cause the at least one processor to perform operations, the operations comprising:
    processing collected far-field environmental noise to a noise segment in a predetermined format;
    establishing a far-field voice recognition model based on the noise segment and a near-field voice segment; and
    determining validity of the noise segment based on the far-field voice recognition model,
    wherein the processing the collected far-field environmental noise into a noise segment in a predetermined format comprises:
        determining a sampling rate of the collected segment of the far-field environmental noise;
        downsampling, in response to the sampling rate of the collected segment being greater than a threshold sampling rate, the collected segment to the threshold sampling rate; and
        discarding the collected segment, in response to the sampling rate of the collected segment being smaller than the threshold sampling rate.

9. The apparatus according to claim 8, wherein the operations further comprise:
    determining a noise collection device associated with the far-field environmental noise, wherein the noise collection device is at least one of following items:
    a loudspeaker,
    a mobile phone, or
    a vehicle-mounted device;
    sending a signal for triggering the noise collection device to collect the far-field environmental noise, to the noise collection device; and
    receiving a collected segment of the far-field environmental noise from the noise collection device.

10. The apparatus according to claim 8, wherein the far-field environmental noise comprises at least one of following items:

household noise,
vehicle and machine noise,
office noise, or
workstation noise.

11. The apparatus according to claim 8, wherein the processing the collected far-field environmental noise into a noise segment in a predetermined format comprises:
   determining a length of the collected segment of the far-field environmental noise;
   cutting the collected segment in response to the length of the collected segment being greater than a threshold length; and
   expanding a frame of the collected segment in response to the length of the collected segment being less than the threshold length.

12. The apparatus according to claim 8, wherein the processing the collected far-field environmental noise into a noise segment in a predetermined format comprises:
   removing a portion associated with a predetermined voice type from the collected segment of the far-field environmental noise, wherein the predetermined voice type includes at least one of following items:
   a natural language voice; or
   a prompt tone for wakening the noise collection device.

13. The apparatus according to claim 8, wherein the establishing the far-field voice recognition model comprises:
   adding noise to the near-field voice segment using the noise segment; and
   establishing the far-field voice recognition model based on adding the noise.

14. The apparatus according to claim 8, wherein the determining validity of the noise segment comprises:
   acquiring an eigenvalue associated with voice recognition performance by decoding the far-field voice recognition model;
   determining the noise segment being valid in response to the eigenvalue being greater than a threshold eigenvalue; and
   determining the noise segment being invalid in response to the eigenvalue being smaller than the threshold eigenvalue.

15. A non-transitory computer readable storage medium, storing a computer program therein, the program, when executed by a processor, causes the processor to perform operations, the operations comprising:
   processing collected far-field environmental noise into a noise segment in a predetermined format;
   establishing a far-field voice recognition model based on the noise segment and a near-field voice segment; and
   determining validity of the noise segment based on the far-field voice recognition model,
   wherein the processing the collected far-field environmental noise into a noise segment in a predetermined format comprises:
   determining a sampling rate of the collected segment of the far-field environmental noise;
   downsampling, in response to the sampling rate of the collected segment being greater than a threshold sampling rate, the collected segment to the threshold sampling rate; and
   discarding the collected segment, in response to the sampling rate of the collected segment being smaller than the threshold sampling rate.

\* \* \* \* \*